United States Patent

[11] 3,586,088

[72] Inventor Taizo Hashida
   Nishinomiya-shi, Japan
[21] Appl. No. 844,341
[22] Filed July 24, 1969
[45] Patented June 22, 1971
[73] Assignee The Toyo Rubber Industry Co., Ltd.
   Osaka, Japan
[32] Priority July 24, 1968
[33] Japan
[31] 43/52288

[54] PNEUMATIC TIRE
   2 Claims, 1 Drawing Fig.
[52] U.S. Cl. .................................................. 152/361
[51] Int. Cl. .................................................. B60c 9/06
[50] Field of Search ......................................... 152/361, 354, 356

[56] References Cited
UNITED STATES PATENTS

| | | | |
|---|---|---|---|
| 3,404,721 | 10/1968 | Massoubre | 152/361 |
| 3,426,825 | 2/1969 | Leibee | 152/361 |
| 3,500,889 | 3/1970 | Boileau | 152/361 |

OTHER REFERENCES

Book - WATER-SOLUBLE Resins," 2nd Edition, 1962, Chapter 6 relied upon. Copy available in Gr. 144, TP978 D3

*Primary Examiner*—Drayton E. Hoffman
*Attorney*—Sughrue, Rothwell, Mion, Zinn & Macpeak ABSTRACT: A pneumatic tire having at least one ply layer of polyester cord slanted with regard to the radial direction of the tire and at least one breaker layer between the ply layer and the tread layer formed of a polyvinyl alcohol-type synthetic fiber cord having a Young's modulus of 1,000 to 2,100 kg./mm.$^2$.

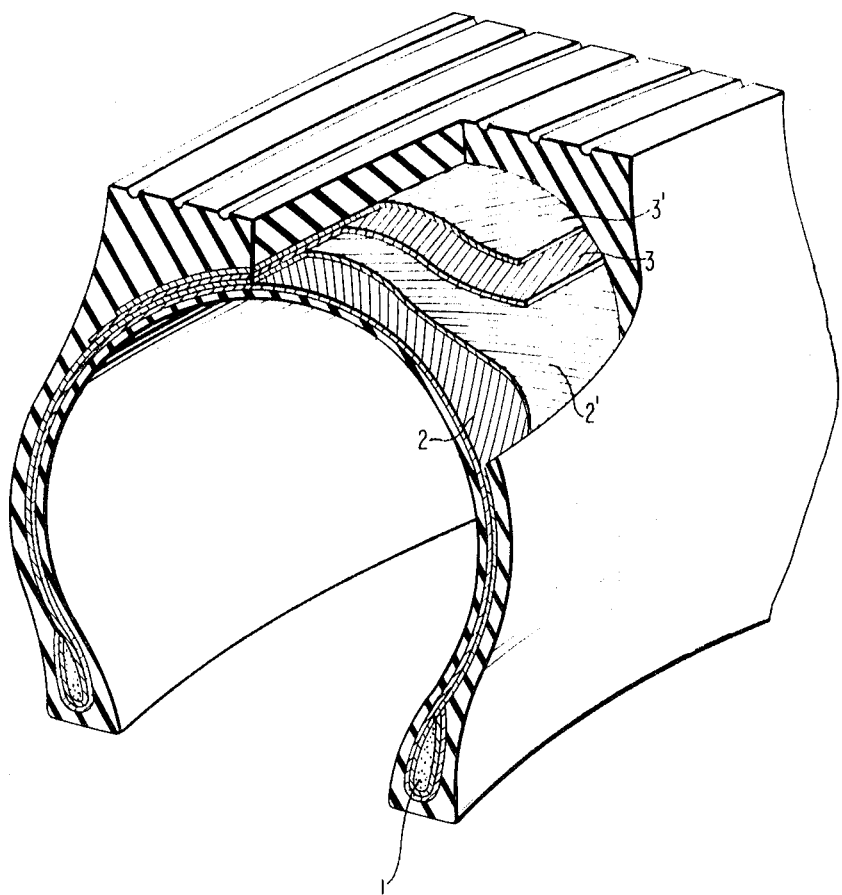
INVENTOR
TAIZO HASHIDA

PNEUMATIC TIRE

BACKGROUND OF THE INVENTION

1. Field of the Invention

This invention relates to a pneumatic tire and, more particularly, to an improved belted bias ply tire.

2. Description of the Prior Art

Pneumatic tires hitherto generally known are classified by their structures into three types: (1) a bias angle-type in which ply cords cross each other at a slant to the radial direction of tire; (2) a radial ply tire in which ply cords lie parallel or substantially parallel to the radial direction of tire and in which breaker cords are substantially parallel to the peripheral or circumferential direction of tire; and (3) a belted bias ply tire in which ply cords cross each other at a slant to the radial direction of tire as in the case of (1) and wherein breaker cords are disposed on a bias or slant with each other and with respect to the peripheral or circumferential direction of tire at a relatively low angle. Among these, the belted bias ply tire of the type (3) which has a structure as a combination of that of (1) and (2) is increasing in demand because, based on its structure, it is superior in high speed running, abrasion resistance, cornering and comfortability in riding and has a smaller rolling resistance than the ordinary bias angle tires. Further, it is possible to manufacture the belted bias ply tire in a production line similar to bias angle tires.

BRIEF DESCRIPTION OF THE DRAWING

In the explanation of the present invention in detail, the construction of the belted bias ply tire 3) will be illustrated by the accompanying drawing.

In the drawing, the figure illustrates a fragmentary perspective view, with portions broken away, of the belted bias ply tire.

DESCRIPTION OF THE PREFERRED EMBODIMENT

Referring to the figure, to a pair of bead wires 1 are fixed ply layers 2,2' along the periphery of tire to form a carcass. The ply cord 2 and 2' cross each other at a slant to the radial direction of the tire, forming two layers. Between the ply layer 2 and 2' and the tread 4, there are provided breaker layers 3,3', the breaker cord 3 and 3' crossing with each other and at a slant with the peripheral or circumferential direction of the tire at a relatively low angle to for two layers overlapped.

The superiority of the belted bias ply tire may be attributable mainly to the alignment of its breaker cord as in the case of the radial ply tire, and it may safely be said that the performance of tire depends on its breaker cord. Hitherto, there have been used in the bias angle cord tire a nylon or polyester cord as ply cord and a steel, glass or extremely high modulus rayon cord as breaker cord (the extremely high modulus rayon hereinafter referred to as "EMH rayon"). As a result of detailed experiments on various belted bias ply tires formed of combinations of such cord materials, we have found that the tires have various defects with respect to the breaker cord, as mentioned hereinafter.

In the case of steel cord, although the tire formed thereof has good abrasion resistance and cornering characteristics in virtue of its very high Young's modulus, as high as 7,000— 8,000 kg./mm.$^2$ (as determined by a chemical fiber tire cord testing method, in accordance with JIS L-1017) and the tire withstands ordinary use, there often occurs early tread separation and failure of tire due to an insufficient bonding of the cords and rubber when subjected to a high speed running at a speed of at least 200 km./hr. The failure occurs especially in the intersurface between steel cord and rubber at which the Young's modulus changes extremely. In addition, in the case of an ordinary speed running, once a cut is formed in the tire tread and, for instance, rain water penetrates into the tire, there occurs erosion and subsequent failure of the tire. Furthermore, the tire is too brittle to a local deformation owing to poor fatigue resistance and inferior in comfortability during riding, to the others, owing to the high Young's modulus of the steel cord.

In the case of glass cord, the tire has better running characteristic owing to the higher Young's modulus, i.e., about 3,000 kg./mm.$^2$, than those of the ordinary fibers. However, the tire reinforced with glass breaker cords is inferior in its shock absorbing property, against a shock imposed thereto by contact with an obstacle during running and, accordingly, is apt to be cut or suffer other injury. If the injury reaches the breaker layer, there will occur penetration of the soil and sand on the road to cause abrasion of the glass breaker cords into a powdery form and, consequently, failure of the tire. Although the quality of the glass cords has recently been improved, glass cord is yet inferior in fatigue resistance to the other fibers and, when a local deformation is imposed thereto, the glass cord becomes fatigued and, if further imposed to a shock, it will suddenly be broken. In addition, if a tire of the glass fiber ply cord, being insufficient in adhesion between rubber and glass fiber, is run at a high speed, at least 200 km./hr., there will occur concentration of stress at the interface of the glass cord and rubber with an extreme change in Young's modulus and subsequent separation there between, causing tire failure.

Finally, in the case of EHM rayon, although its Young's modulus is about 2,000 kg./mm.$^2$ and is lower than that of the steel cord and of the glass cord, it is about three to five times that of a rayon, nylon or polyester cord used in the ordinary bias angle tires. The EMH cord withstands ordinary practical use, but it has been found that, if a tire having the EHM rayon cord is subjected to running at a speed of at least 200 km./hr., there occurs an early separation and failure owing to an insufficient bonding strength between the cord and rubber, especially when the cord has a high moisture content. The high speed durability of the tire constructed using this cord depends greatly on the moisture content of EHM rayon cords and suddenly decreases if the moisture content exceeds 4—5 percent. However, the moisture content of EHM rayon cords under normal conditions, as defined by JIS Z8703 is 11 to 13 percent, and it is necessary, for maintaining the moisture content at 4 to 5 percent or less, to put the cord under an extremely low humidity condition or to employ a demoistening apparatus resulting in an economical disadvantage in the manufacture of such tires. In addition, the EHM rayon cord is poor in water resistance and, if external water penetrates into the tire as a result of failure of the tire tread, the strength of the cord and bonding strength between the cord and rubber reduces to two-thirds of their original values and this causes early failure of the tire.

As described above in detail, it is common in the belted bias ply tires now in practical use, that they cannot withstand high speed running at a speed of 200 km./hr. or more, an early failure occurs in which the tread is injured. It has been found that those defects are mainly attributable to the quality of breaker cord used.

The above defects in the prior belted bias ply tires may be eliminated by an appropriate choice of a material for breaker cord and, as a result of many investigations, I have found that there is an unexpected result obtained by use of a cord formed of an extremely high modulus polyvinyl alcohol-type synthetic fiber. The present invention consists of a pneumatic tire which is characterized by the combination of one or more ply layers consisting of polyester cord which are fixed to a pair of bead wires which cross each other in the radial direction of tire and one or more breaker layers which are interposed between the ply layers and the tread rubber which consist of cord of a synthetic fiber having a Young's modulus of 1,000 to 2,100 kg./mm.$^2$.

The Young's modulus of synthetic fibers used as a breaker cord in the belted bias ply tire of the present invention range from 1,000 kg./mm.$^2$. and 2,100 kg./mm.$^2$. By use of a cord fabric formed of a synthetic fiber of such restricted Young's modulus, there is obtained a belted bias ply tire which retains good comfortability during riding comparable to an ordinary bias angle tire, with an advantage as a belted bias ply tire owing to that the Young's modulus of the cord is several times than that of a cord used in an ordinary bias angle tire. If the Young's modulus is less than 1,000 kg./mm.$^2$, there is obtained a tire similar, especially, in abrasion resistance and cornering characteristic, to the ordinary bias angle tires. And, if the Young's modulus is more than 2,100 kg./mm.$^2$, the cord has a lower fatigue resistance and it is difficult and, therefore, impracticable to produce the synthetic fiber of such a high Young's modulus. For the purpose of the present invention, the preferred range of the Young's modulus is 1,500 to 1,800 kg./mm.$^2$.

The synthetic fiber of a Young's modulus of 1,000 to 2,100 kg./mm.$^2$ which is used in the practice of the present invention may be obtained by an appropriate choice or adjustment of various working conditions in the manufacture of polyvinyl alcohol fiber and is quite different in property from the nylon, vinylon and polyester fiber of Young's modulus of 300 to 700 kg./mm.$^2$ which have been used in the ordinary bias ply tires.

The use of such a polyvinyl alcohol fiber as breaker cord material makes it possible to maintain the moisture content of breaker cord in normal state at 4 percent or less. Accordingly, the resulting tire exhibits good adhesion between the cord and rubber and withstands a high speed running at 200 km./hr. because there is no reduction in high speed durability due to moisture absorption as is usual in the case of an EHM rayon cord breaker.

In addition, in the case of the tire of the present invention, the fatigue and deterioration of cord in the section subject to a local deformation are minimized since it is free from early failure of the tire, caused by loss of strength and adhesion in the injured portion of the tread as in the case of tires manufactured using as breaker cord an EHM rayon or steel wire with corrosion of the cord.

EXAMPLE

Comparing the properties of a tire of the present invention with the ordinary belted bias ply tires using as a standard a tire which was made employing an EHM rayon as breaker cord, there were obtained the results as summarized in the following table. The polyester cord used in the experiment was in all cases formed of a polyester cord of 1,000 d/2, and the breaker of tires in accordance with the present invention was formed of a polyvinyl alcohol fiber cord of a Young's modulus of 2,000 kg./mm.$^2$ (A) and of 1,700 kg./mm.$^2$ (B), respectively.

|  | Polyester (ply), Polyvinyl alcohol (breaker) [1] | | Polyester (ply), Steel (breaker) [2] | Polyester (ply), Glass (breaker) [3] | Polyester (ply), EHM rayon (breaker) [2] |
| --- | --- | --- | --- | --- | --- |
|  | (A) | (B) | | | |
| High speed durability at 200 km./hr. | + | + | − | − | − |
| Abrasion resistance | 120 | 118 | 130 | 110 | 100 |
| Cornering characteristic | 110 | 109 | 115 | 110 | 100 |
| Fatigue resistance (breaker) | 180 | 210 | 90 | 70 | 100 |
| Water resistance | 180 | 180 | 100 | 200 | 100 |
| Comfortability on riding | 105 | 110 | 80 | 90 | 100 |

[1] Cords of this invention.
[2] Cords of comparative.

Note: The test methods were as follows: (1) High speed running property: A relative running time until failure at a speed of 180 km./hr. on a drum tester. (2) Abrasion resistance: The relative loss of tread thickness, determined by fitting the tire to a car and measuring the depth of the tread grooves before and after running of 10,000 km.
(3) Cornering characteristic: The relative value of cornering force (kg./deg.) determined by giving a cornering of 3° to a tire on a rotary drum revolving at a peripheral speed of 30 km./hr.
(4) Fatigue resistance of breaker: The relative value of retention (percent) of the cord strength after 10,000 km. running of tire fitted to a car.
(6) Water resistance: The relative value of retention (percent) of the strength of the cord fabric in a width of 2.5 cm. in the direction of the periphery of tire crown, determined by breaking up a tire and measuring, after soaking in water for five days, the strength of the cord fabric by means of a hydraulic tensile tester.
(7) Comfortability on riding: An average of the marks on the basis of 100 points of the comfortability given by two men and two women when they are riding on a car fitted with the test tires and the car is run on the same road at the same speed.

What I claim is:

1. A pneumatic tire comprising, in combination, at least one ply layer consisting of a polyester cord which is coupled to a pair of bead wires and crosses at a slant to the radial direction of the tire and at least one breaker layer interposed between said ply layer and the tread, said breaker layer consisting of a polyvinyl alcohol-type synthetic fiber cord having a Young's modulus of 1,000 to 2,100 kg./mm.$^2$.

2. A pneumatic tire as defined in claim 1 in which the breaker layer cord is formed of a polyvinyl alcohol-type fiber having a Young's modulus of 1,500 to 1,800 kg./mm.$^2$.